(12) United States Patent
Weggenmann et al.

(10) Patent No.: US 10,999,256 B2
(45) Date of Patent: May 4, 2021

(54) METHOD AND SYSTEM FOR AUTOMATED TEXT ANONYMIZATION

(71) Applicant: SAP SE, Walldorf (DE)

(72) Inventors: Benjamin Weggenmann, Karlsruhe (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 542 days.

(21) Appl. No.: 15/881,958

(22) Filed: Jan. 29, 2018

(65) Prior Publication Data
US 2019/0238516 A1 Aug. 1, 2019

(51) Int. Cl.
*H04L 29/06* (2006.01)
*H04W 12/02* (2009.01)

(52) U.S. Cl.
CPC ......... *H04L 63/0428* (2013.01); *H04W 12/02* (2013.01)

(58) Field of Classification Search
CPC ........... H04L 63/0428; H04L 63/0421; H04W 12/02; G06F 21/6254; G06F 40/247; G06F 40/284; G06F 40/216; G06F 40/20
See application file for complete search history.

(56) References Cited

U.S. PATENT DOCUMENTS

| | | | | |
|---|---|---|---|---|
| 10,140,321 B2* | 11/2018 | Hakkani-Tur | ........ | G06F 16/215 |
| 2009/0174551 A1* | 7/2009 | Quinn | .................. | G06F 21/552 340/540 |
| 2011/0282964 A1* | 11/2011 | Krishnaswamy | ...... | G06Q 30/02 709/217 |
| 2012/0072409 A1* | 3/2012 | Perry | ................. | G06Q 30/0601 707/710 |
| 2012/0078834 A1* | 3/2012 | Sainath | ................. | G06F 40/216 706/50 |
| 2012/0197627 A1* | 8/2012 | Shi | .......................... | G06F 16/35 704/2 |
| 2014/0228701 A1* | 8/2014 | Chizeck | .............. | G06F 21/6254 600/544 |
| 2015/0199333 A1* | 7/2015 | Nekhay | ................... | G06F 40/30 704/9 |
| 2019/0156061 A1* | 5/2019 | Chakraborty | ......... | G06F 16/258 |
| 2019/0238516 A1* | 8/2019 | Weggenmann | ....... | G06F 40/216 |

* cited by examiner

*Primary Examiner* — Maung T Lwin
*Assistant Examiner* — Sanchit K Sarker
(74) *Attorney, Agent, or Firm* — Schwegman Lundberg & Woessner, P.A.

(57) ABSTRACT

A method of producing an anonymized vector for a text mining task in lieu of a feature vector is disclosed. A vocabulary is created from a corpus of documents, each of the corpus of documents having a context that is similar to a set of target documents. The set of target documents is received. The feature vector is generated from a first document of the set of target documents. The feature vector is transformed into a composition vector. A synthetic vector is constructed based on the composition vector. The synthetic vector is shared as the anonymized vector in lieu of the feature vector.

17 Claims, 14 Drawing Sheets

| ALGORITHM 1: SYNTF TERM-FREQUENCY VECTOR SYNTHESIS |
|---|
| INPUT: DOCUMENT VECTOR $\theta_T$, DESIRED OUTPUT LENGTH $N$, PRIVACY PARAMETER $\varepsilon > 0$, RATING FUNCTION $P: V \times V \to [0,1]$ |
| RESULT: SYNTHETIC TF VECTOR $S \in \mathbb{N}^{|V|}$ WITH $|S| = N$ |
| 1    FOR $I \leftarrow 1$ TO $N$ DO      // PRODUCE OUTPUT TERM-BY-TERM |
| 2      $V_I \leftarrow_R \text{CAT}(\theta_T)$;      // SAMPLE WORD $V_I$ |
| 3      $W_I \leftarrow_R E_{\varepsilon,\rho}(V_I)$;      // CHOOSE SYNONYM FOR $V_I$ |
| 4    END |
| 5    $S \leftarrow (|\{I \in [1, N] : W_I = W\}|)_{W \in V}$;      // COUNT SYNONYMS |

*FIG. 4*

ATTACK SCENARIOS WITH MINIMUM PER AUTHOR NUMBERS FOR ACTIVE GROUPS AND TRAIN/TEST MESSAGES IN THE DATASET

| SCENARIO | SUSPECTS | #GROUPS | #TRAIN | #TEST |
| --- | --- | --- | --- | --- |
| TOP 5/ANY | TOP 5 | ≥ 1 | ≥ 35 | ≥ 17 |
| TOP 10/ANY | TOP 10 | ≥ 1 | ≥ 28 | ≥ 9 |
| TOP 5/MULTI | TOP 5 | ≥ 2 | ≥ 29 | ≥ 9 |
| TOP 10/MULTI | TOP 10 | ≥ 2 | ≥ 21 | ≥ 8 |

700

EVALUATE AND OPTIMAL SYNTF PARAMETERS

| PARAMETER | VALUES | DESCRIPTION |
|---|---|---|
| MORPHOLOGY | LEMMA<br>LOWER<br>ORTH | LEMMATIZE WORDS.<br>CONVERT WORDS TO LOWER CASE.<br>LEAVE SPELLING UNCHANGED. |
| ADD SYNSETS | TRUE/FALSE | EXTEND VOCABULARY WITH ADDITIONAL SYNONYMS FROM WORDNET. |
| $S$ | 0, 0.1, 0.2, 0.3, 0.4 | IMPACT FACTOR OF LETTER BIGRAM OVERLAP ON SCORING FINCTION $P$. |
| $N$ | 100, 150, 200 | LENGTH OF OUTPUT VECTOR (WORDS). |
| $E$ | 35-55 (BEST: 47.5, EFFECTIVELY 25.4) | PRIVACY PARAMETER (STEPSIZE 2.5).<br>EFFECTIVE PRIVACY LOSS, CF. SEC. 3.4.2. |

*FIG. 7*

THE MAIN SYNTF PROCESSING PIPELINE, INCLUDING PARAMETERS

SUBSEQUENT TEXT CLASSIFICATION PIPELINE

SUBSEQUENT AUTHORSHIP ATTRIBUTION PIPELINE. REVERSE-VECTORIZED TEXTS ARE REQUIRED TO (AT LEAST PARTIALLY) DEDUCE WRITEPRINTS FEATURES

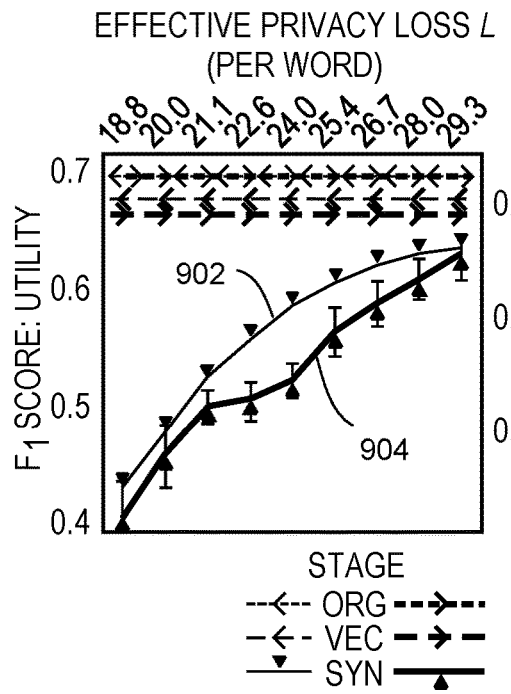
*FIG. 9A1*
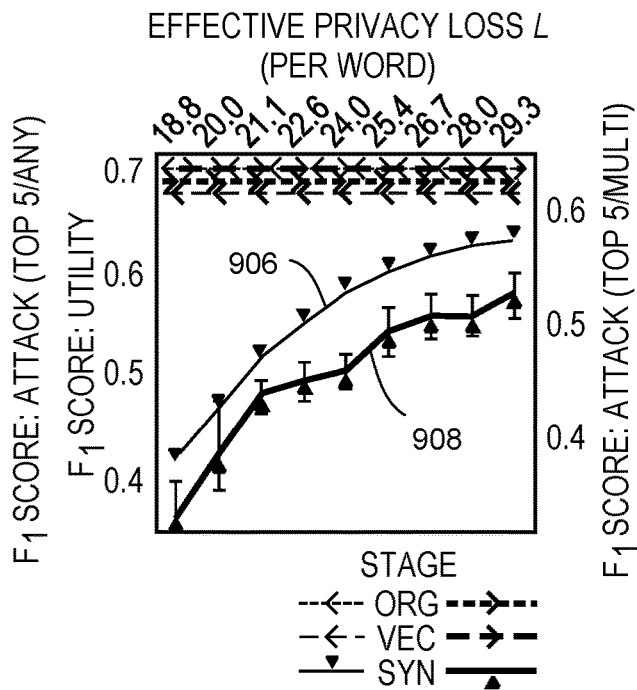
*FIG. 9A2*
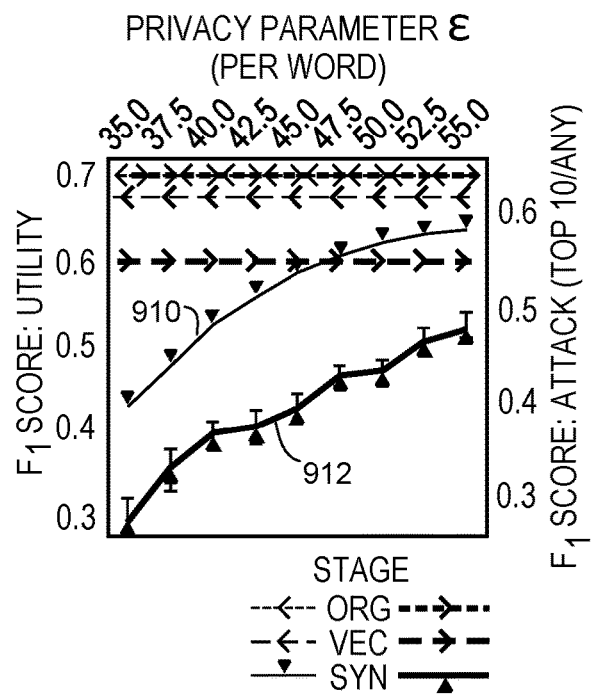
*FIG. 9A3*
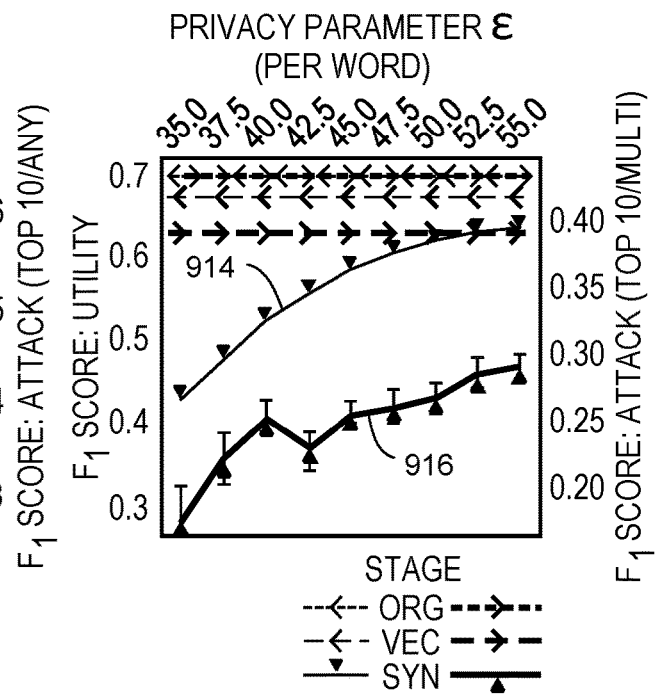
*FIG. 9A4*

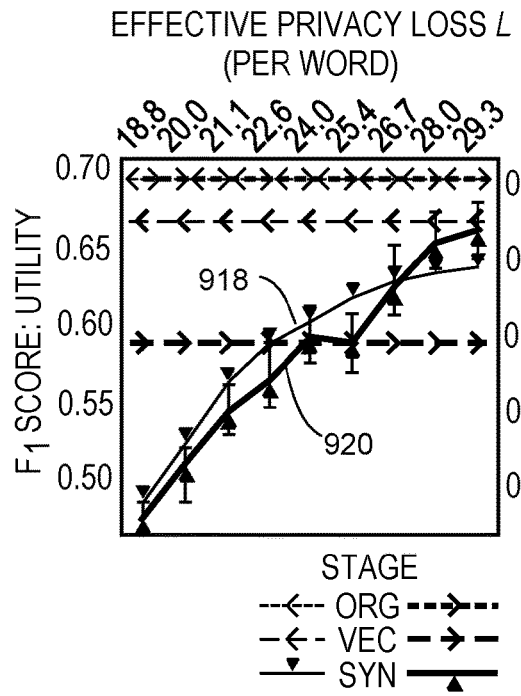
FIG. 9B1
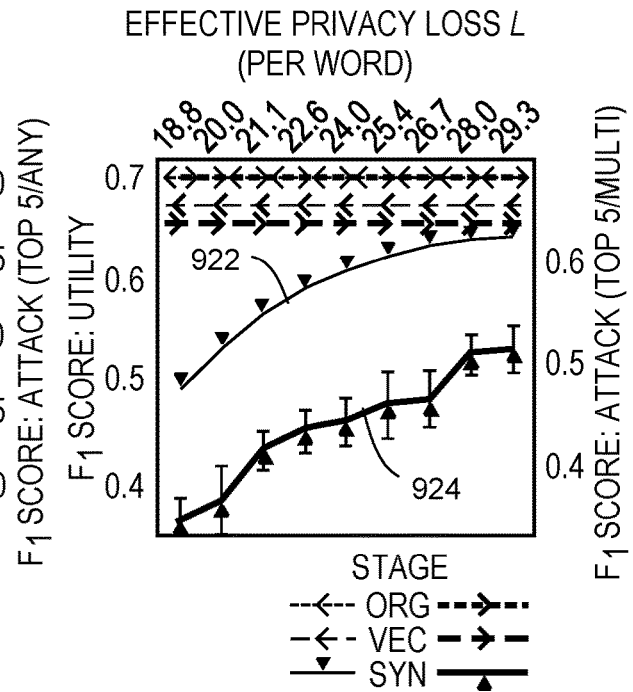
FIG. 9B2
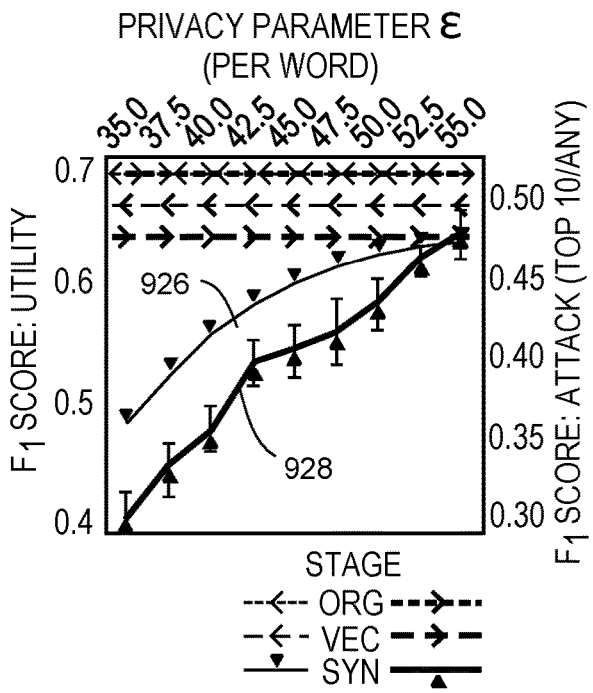
FIG. 9B3
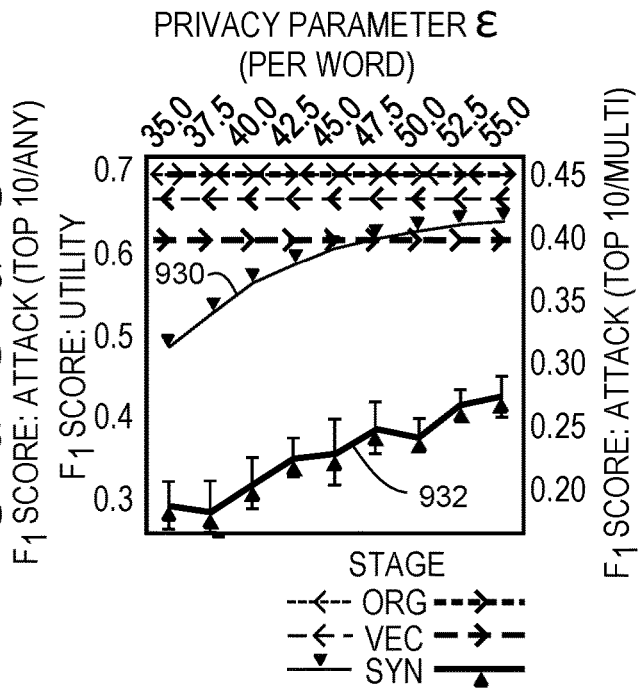
FIG. 9B4

COMPARISON BETWEEN TRADITIONAL DE-IDENTIFICATION (SCRUBBING) AND OUR SYNTF METHOD

1200

EVALUATION RESULTS (TOP 10/ANY)

| METHOD | UTILITY | | | ATTACK | | | GAIN |
|---|---|---|---|---|---|---|---|
| | $F_1$ | P | R | $F_1$ | P | R | $\Delta F_1$ |
| NONE (PLAINTEXT) | 0.69 | 0.71 | 0.70 | 0.64 | 0.71 | 0.63 | 0.06 |
| SYNTF ABS. | 0.60 | 0.61 | 0.61 | 0.42 | 0.44 | 0.43 | 0.18 |
| SCRUBADUB ABS. | 0.64 | 0.65 | 0.65 | 0.57 | 0.63 | 0.57 | 0.06 |
| SYNTF REL. | 87% | 86% | 87% | 66% | 61% | 69% | 20% |
| SCRUBADUB REL. | 92% | 92% | 92% | 90% | 88% | 91% | 02% |

*FIG. 12*

METHOD AND SYSTEM FOR AUTOMATED TEXT ANONYMIZATION

TECHNICAL FIELD

The present disclosure generally relates to text obfuscation and, in one specific example, to synthetic and differentially private term frequency vectors for privacy-preserving text mining.

BACKGROUND

For centuries, text has been used to convey information between human beings through books, letters, newspapers and magazines. With the advent of the digital age, more and more textual data is being processed and analyzed by machines. Text mining techniques such as text classification, clustering, and sentiment analysis, have been developed to assist us with sorting, filtering, and analyzing documents with the help of computers. In many cases, it is desirable that the author of a text remains anonymous: Search logs can reveal many personal details about a user, critical articles or messages about a company (or government) might have severe (or fatal) consequences for a critic, and negative feedback in customer surveys might negatively impact business relations if the client is identified. Simply removing personally identifying information from a document is, however, insufficient in protecting the identity of the writer. Given some reference texts of suspected authors, so-called authorship attribution techniques allow the re-identification of the author from the text itself. Previous countermeasures to obfuscate texts had only limited success against advanced authorship attribution techniques.

BRIEF DESCRIPTION OF THE DRAWINGS

FIG. 4 is a listing of pseudo code for an example algorithm for a synthesis phase of the SynTF mechanism disclosed herein.

FIG. 7 is a table of example evaluated and optimal parameters for the SynTF mechanism.

FIGS. 9A1-9B4 are graphs depicting the relative performance between utility and attack in the different stages of the SynTF mechanism.

FIG. 12 is a table depicting example evaluation results.

DETAILED DESCRIPTION

Figure 1:
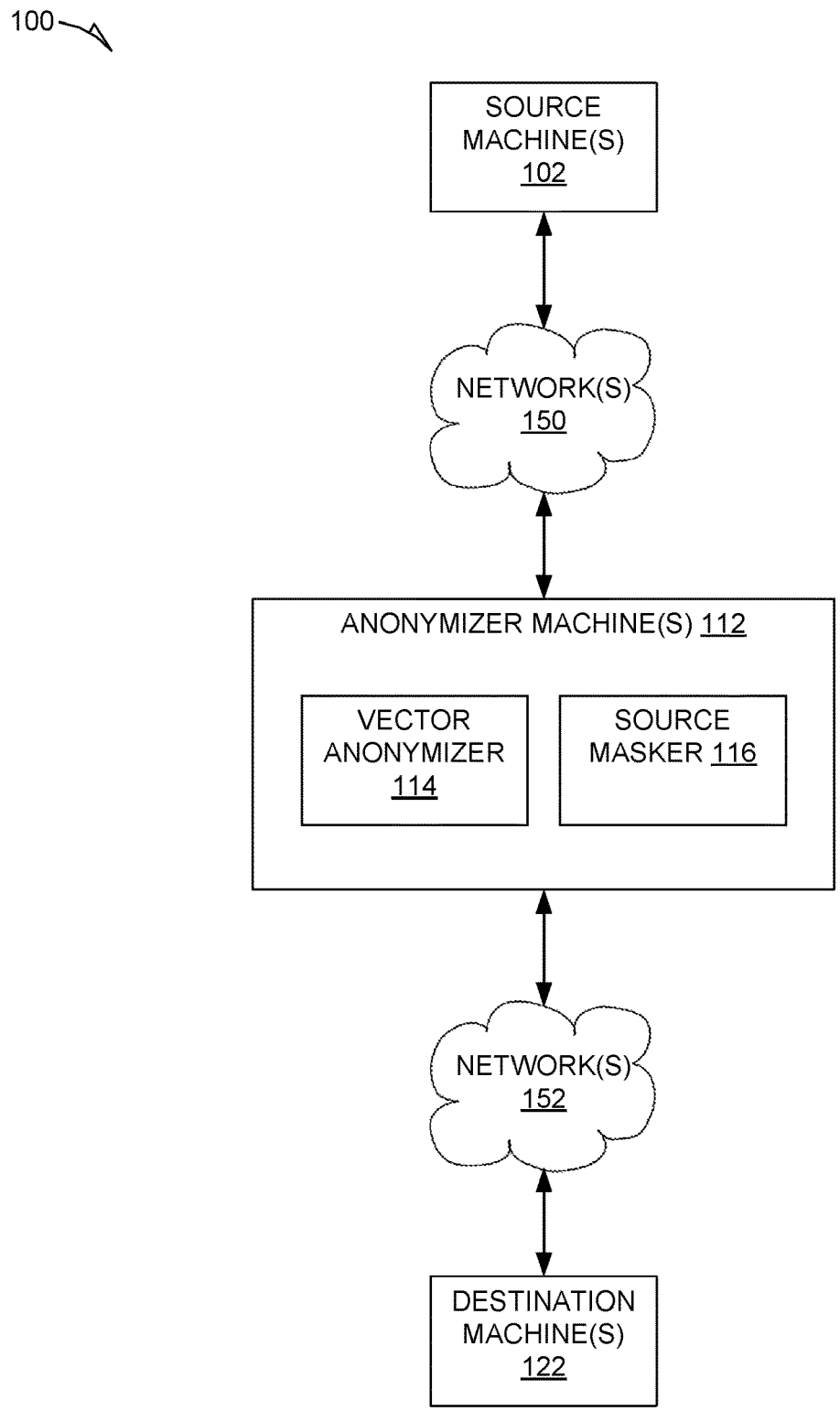
FIG. 1 is a block diagram depicting an example system for implementing the methods and operations disclosed herein.

In the following description, for purposes of explanation, numerous specific details are set forth in order to provide an understanding of example embodiments of the present subject matter. It will be evident, however, to those skilled in the art that example embodiments may be practiced without these specific details.

An automated text anonymization approach is disclosed that produces synthetic term frequency vectors for the input documents that can be used in lieu of the original ones in many common text mining tasks. The method can be evaluated on an example text classification task and it can be demonstrated that, in example embodiments, it only has a low impact on its accuracy. In example embodiments, the method strongly affects authorship attribution techniques to the level that they become infeasible with a much stronger impact on their accuracy. In contrast to previous authorship obfuscation methods, the approach fulfills differential privacy and hence comes with a provable plausible deniability guarantee.

Machine processing and analyzing tasks may include any of the following: text classification, which may, for example, be used for spam filtering and automated email routing; and document retrieval, where indexed documents are retrieved and ranked according to search queries; sentiment analysis; and a wide variety of other common tasks in the Information Retrieval (IR) and Natural Language Processing (NLP) domains.

In many cases, it is desirable for an author that his writings stay anonymous. This could be the case if the textual data contains sensitive information about its author, for instance in search queries. Negative feedback from customer surveys might negatively impact business relations if the author is known, and critical news or bldg articles about a company (or government) might have severe (or fatal) consequences for the author of the article. In other areas, anonymity is required for compliance or legal reasons, e.g. in the selection of job candidates to eliminate discrimination. Furthermore, without anonymity people and data owners might feel reluctant to participate in surveys or to release their data. Offering anonymity might be a means to convince them to share their data in an anonymized form, which could then be used to perform evaluations and as training data for machine learning models.

Traditional sanitization approaches for free text include removing personally identifiable information (PII) such as the author's name, or replacing it with a pseudonym. However, these methods are insufficient for protecting the author's identity: As the famous Netflix de-anonymization attack and studies have shown, the originator of data can be re-identified from the data itself. The case of the AOL search data release is illustrative, where search queries of over 650,000 users were released for research purposes in 2006. The search logs were "anonymized" by linking the queries to their users through a numerical identifier instead of the actual user name. After some investigation in the search queries, the New York Times eventually learned enough information about user 4417749 so they could re-identify her as Thelma Arnold, a 62-year-old widow from Lilburn, Ga.

The task of attributing authorship of an anonymous or disputed document to its respective author is called authorship attribution. Such methods usually make use of stylistic features to identify or discriminate authors, as has been done with the statistical techniques to resolve the dispute of the Federalist Papers. More sophisticated methods may use statistical analysis and machine learning to tackle the problem. While these powerful methods are useful in the literary world and in forensics, they can often pose a threat on the privacy and integrity of authors of documents with potentially sensitive content.

A differentially private mechanism, called the "SynTF" mechanism, is disclosed herein to compute anonymized, synthetic term frequency vectors for textual data that can be used as feature vectors for common text mining tasks such as text classification.

Theoretical results are given on the differential privacy properties of the method. Improved bounds for the privacy loss of the method are derived and a heuristic argument is given that differential privacy on large (discrete) output spaces demands a large privacy loss if the result should fulfill a minimum usefulness requirement.

The method may be experimentally verified (e.g., on a corpus of newsgroups postings). For example, a (benign) analyst wants to classify the documents into certain topics, whereas a malicious attacker tries to re-identify the author of these documents using authorship attribution techniques. The results show that the method has a much stronger impact on the attacker's than on the analyst's task.

In example embodiments, a method of producing an anonymized vector for a text mining task in lieu of a feature vector is disclosed. A vocabulary is created from a corpus of documents, each of the corpus of documents having a context that is similar to a set of target documents. The set of target documents is received. The feature vector is generated from a first document of the set of target documents. The feature vector is transformed into a composition vector. A synthetic vector is constructed based on the composition vector. The synthetic vector is shared as the anonymized vector in lieu of the feature vector.

In example embodiments, one or more modules are incorporated into one or more computer memories, the one or more modules configuring one or more computer processors to perform one or more of the operations or methodologies described herein.

FIG. 1 is a block diagram depicting an example system 100 for implementing the methods and operations disclosed herein. The system 100 includes a source machine 102, which is communicatively coupled (e.g., via a network 150, such as the Internet, a Wide Area Network (WAN), or a Local Area Network (LAN)) to an anonymizer machine 112. The anonymizer machine includes one or more modules, such as a vector anonymizer 114 and a source masker 116. In example embodiments, the vector anonymizer 114 anonymizes one or more feature vectors received from source machine 102, as described in more detail below. In example embodiments, the source masker 116 anonymizes the source machine 102. In example embodiments, the source masker 116 is an optional system (e.g., if the source machines trust the vector anonymizer 114 to not reveal the data source to the destination machine 122). The anonymizer machine 112 is communicatively coupled via a network 152 to a destination machine 122. In example embodiments, the destination machine is configured to receive one or more anonymized or synthetic vectors from the anonymizer machine 112 in lieu of one or more feature vectors generated at the source machine 102 for use in one or more text mining tasks, as described in more detail below.

Text Classification

Text classification is the problem of assigning a given text to one or more predefined categories. It has many applications, for instance in the automated sorting and filtering of email messages, spam filtering, categorization of news articles, etc. The problem may be solved using machine learning techniques. In the supervised model, a classifier is trained based on a set of documents with known categories so it can recognize characteristic features in the text that indicate the right category. A trained classifier can then predict the most likely category for new texts whose category is unknown.

For text mining tasks such as text classification, documents may be represented in the vector space and Bag-of-Words (BoW) models: The documents are transformed into feature vectors where each entry corresponds to a certain word in an underlying vocabulary. The process of this transformation is also called valorization. Two representations are term frequency (a) vectors where each entry equals the number of occurrences of the corresponding term in the document, and the term frequency inverse document frequency (tf-idf) vectors which are derived from the term frequency vectors (tf vectors) by also taking the number of documents into account that contain the corresponding term.

Differential privacy (also referred to as $\epsilon$-indistinguishability) works by releasing noisy answers to the database queries, where the noisy results on two databases that differ in only a single record are probabilistically indistinguishable up to a multiplicative factor. Traditional notation is generally used herein, with one deviation being that random mechanisms are described via random variables instead of probability measures on the output space. Since every random variable induces a probability measure on the underlying space, the two definitions are equivalent.

Definition 2.1 (Randomized mechanism). Let X and Z be two sets where Z is measurable, and let R(Z) be the set of random variables on Z. A randomized mechanism from X to Z is a probabilistic function M:X→R(Z) that assigns a random variable on Z to each input x∈X. From an algorithmic point of view, an instance of a randomized mechanism M is run on a given input x by sampling a realization z of the random variable M(x). This is written as $z \leftarrow_R M(x)$.

As noted above, each random variable on Z induces a probability distribution on Z. A continuous/discrete distribution is typically described by its probability density/mass function (pdf/pmt). By slight abuse of notation, we write Pr[X-x] for the pdf/pmf of X.

Definition 2.2 (Adjacency). Given a metric $d_X$ on the space X, two inputs $x_1, x_2 \in X$ are said to be adjacent (with respect to $d_X$) if $d_X(x_1, x_2) \leq 1$. This is written as $x_1 \sim_{d_X} x_2$ (or $x_1 \sim x_2$ if the metric is unambiguous).

Definition 2.3 (Differential Privacy). Let $\epsilon > 0$ be a privacy parameter. A randomized mechanism M:X→R(Z) fulfils $\epsilon$-differential privacy if for any two adjacent inputs $x_1, x_2 \in X$, and any set of possible outputs $Z \subseteq \text{Im}(M)$.

$$Pr[M(x_1) \in Z] \leq e^\epsilon \cdot Pr[M(x_2) \in Z].$$

The privacy loss of a randomized mechanism M is the quantity $$l(M) := \sup_{x_1 \sim x_2} \sup_{Z \in Im(M)} \ln \frac{Pr[M(x_1) \in Z]}{Pr[M(x_2) \in Z]},$$

where it is interpreted that 0/0=0.

Note that $\epsilon$ is an upper bound for the privacy loss, and hence any randomized mechanism M with finite privacy loss l(M) also fulfils $\epsilon$-differential privacy with $\epsilon = l(M)$.

The input space X may model the set of databases over some domain of values V with n records, i.e. $X = V^n$. In the case of textual documents, the vector space/BoW model may be adopted where each document x is represented as feature vector over some vocabulary V of size 1. Since each document is anonymized independently, $X=Z=R_{\geq 0}^I$ is assumed. Any two texts are considered adjacent which is the most strict and conservative way to define adjacency.

The Exponential Mechanism. A very important and versatile building block for differential privacy is the Exponential mechanism by McSherry and Talwar. It applies to both numerical and categorical data and fulfills &differential privacy. It requires a "measure of suitability" for each possible pair of inputs and outputs:

Definition 2.4 (Rating function and sensitivity). A function $\rho: X \times Z \rightarrow R$ is called a rating function from X to Z. The value $\rho(x,z)$ is the rating for input x and output z. The sensitivity $\Delta_\rho$ of the rating function $\rho$ is its largest possible difference given two adjacent inputs, over all possible output values:

$$\Delta_\rho := \max_{z \in Z} \max_{x_1 \sim x_2} (\rho(x_1, z) - \rho(x_2, z))$$

In this scenario with textual data, the rating function $\rho$ will be bounded to [0,1], which implies that its sensitivity is $\Delta_\rho \leq 1$.

Definition 2.5 (Exponential mechanism). Let $\epsilon > 0$ be a privacy parameter, and let $\rho: X \times Z \rightarrow R$ be a rating function. For each $x \in X$, a random variable $E_{\epsilon,\rho}(x)$ is defined that is described by the probability density function (pdf)

$$Pr[E_{\epsilon,\rho}(x) = z] = \frac{\exp\left(\frac{\epsilon}{2\Delta}\rho(x, z)\right)}{\int_{z'} \exp\left(\frac{\epsilon}{2\Delta}\rho(x, z')\right) dz'}$$

Note that a discrete version of the Exponential mechanism for countable Z is obtained by replacing the integral with a sum.

Synthetic Term Frequency Vectors

An intended usage scenario is described below. Then a closer look is taken under the hood of authorship attribution techniques and a basic motivation behind the SynTF mechanism is derived. The mechanism is described in detail and its differential privacy properties are presented.

Consider a data processor that wishes to share sensitive training data for machine learning with a third-party analyst. Feature vectors are sufficient for most machine learning tasks since they are produced by the analyst in a preprocessing step anyway. The SynTF mechanism automatically creates anonymized feature vectors that can be shared with the analyst and which he can use in lieu of his own vectors.

In this scenario, a set of text documents are given, such as email messages, job applications or survey results. The documents are analyzed by a (benign) third-party analyst, who wants to perform a typical text mining task such as text classification. One aim is to prevent authorship attribution attacks as described above. Therefore, to protect the identity of the authors and prevent re-identification, the analyst is only provided with synthetic BoW feature vectors instead of the original documents. Email providers and search engines could share anonymized feature vectors of mails or (aggregated) search queries with advertising networks to provide personalized ads while protecting their users.

Attacker Model. The attacker is presented with a document of unknown authorship which has been written by one of several suspected authors. Her goal is to identify the document's actual author from the group of suspects. It is assumed that she has a set of similar reference documents from each suspect that she can use to help decide which suspect to assign the unknown document to.

The attacker's capability to re-identify the authors on the original plaintexts as well as the anonymized feature vectors is compared. It is assumed the attacker knows the dictionary, so she can convert the numbers in the feature vectors to a textual representation by repeating each word accordingly. This allows her to (partially) deduce more complex features beyond BoW, such as the WritePrints feature set which is often used in authorship attribution. As explained below, most of these features cannot be correctly inferred anymore, which is beneficial for the SynTF mechanism as these are precisely the stylistic features (beyond BoW) that are exclusively exploited by the attacker.

Preventing Authorship Attribution

A typical feature set for authorship attribution may include any of the following types of stylistic features: Lexical Counts of letters, digits, special characters, number of characters and words, etc.; Syntactic Frequency of function words, punctuation, parts of speech (POS) tags; Structural Number and length of paragraphs and sentences. URLs or quoted content, etc.; Content Frequencies of words (BoW model); or Idiosyncratic Misspelled words.

For some features such as letters, words, digits and POS tags, their bi- and trigrams may be considered; thus, order information may be taken into account. These features have a strong capability to capture individual stylistic characteristics expressed by the writer of a text. For instance, one author might subconsciously prefer using the passive voice or past tense, so many verbs will end in an "ed" bigram, whereas another author might tend to use the present continuous or gerund which causes many "ing"-trigrams.

Ordinary text mining tasks such as text classification typically only use content-level features which are often modeled and represented as tf vectors in the BoW model. Most of the stylistic features used for authorship attribution thus get lost in vectorization. In fact, the tf vectors by their very nature do not capture any structural information, and most syntactic features will be destroyed as well. Apart from the content (and idiosyncratic) features, however, lexical features may still be derived if the BoW vocabulary is known.

Since the attacker can still exploit the derived lexical features, the SynTF mechanism aims at disturbing them in a way that keeps the meaning or theme of a document intact, thus further allowing the classification task but impairing authorship attribution. Lexical features are mostly related with the spelling; therefore, the idea is to replace words in the input with words with similar meaning (synonyms) but different spelling to make the lexical features meaningless for the attacker. On the other hand, this will preserve the general theme of the text, so the impact may be little on the classification task.

The SynTF Mechanism

Figure 2:
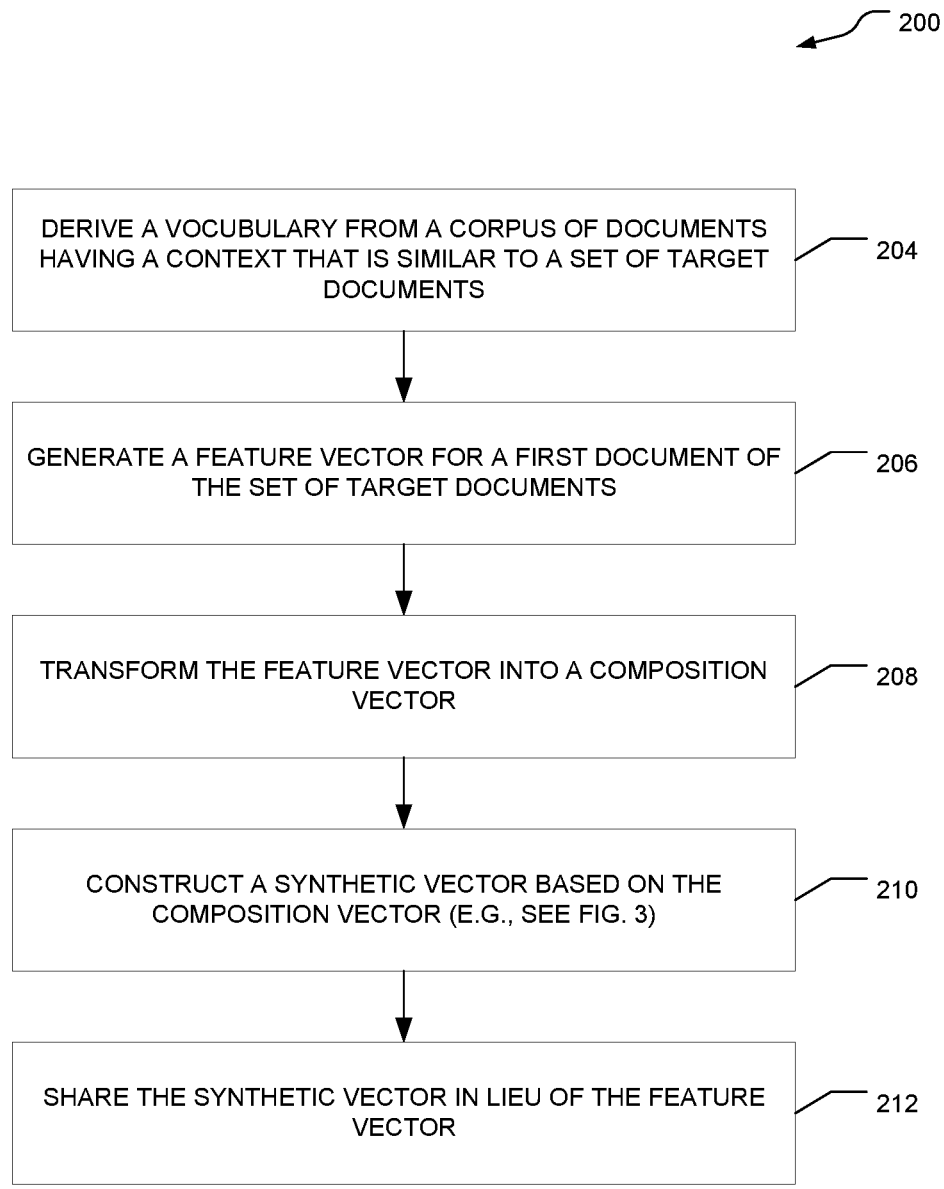
FIG. 2 is a flowchart depicting example operations for sharing a synthetic vector in lieu of a feature vector.
Figure 3:
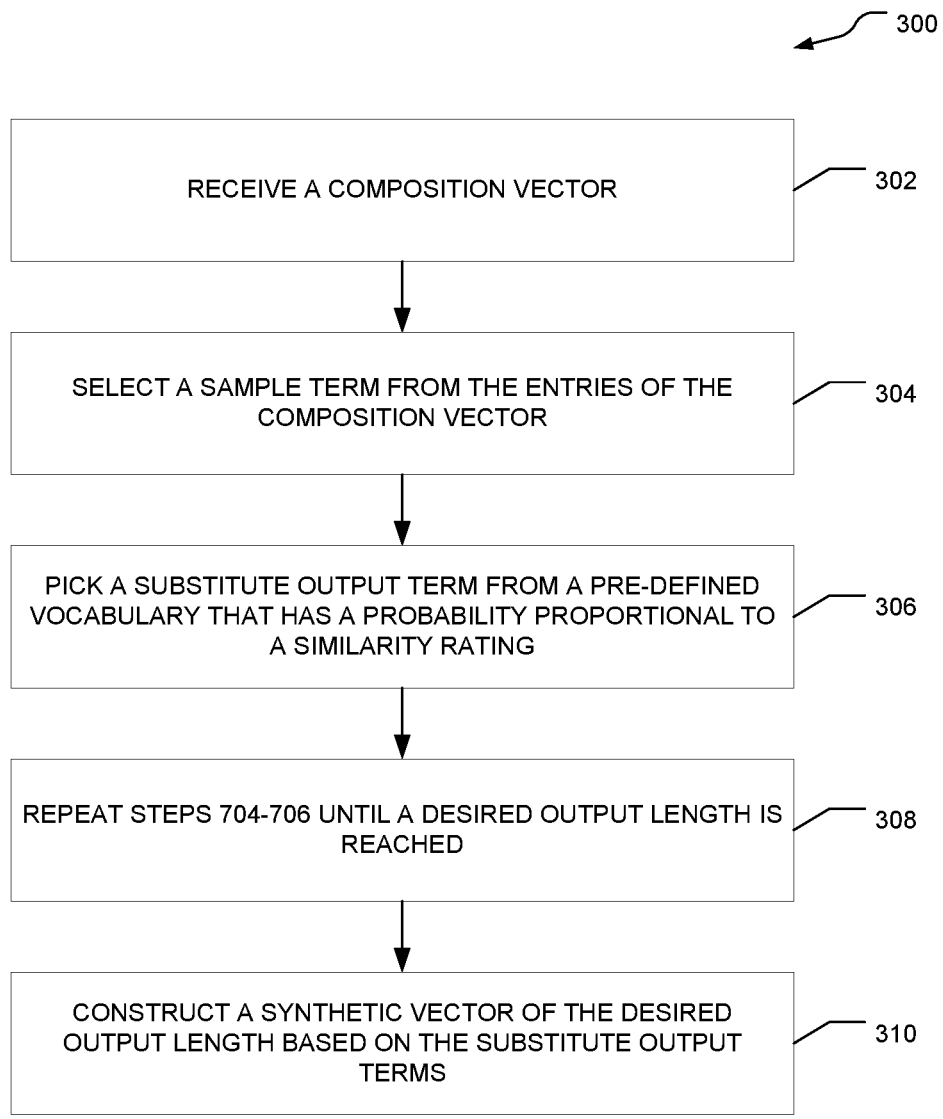
FIG. 3 is a flowchart depicting example operations for constructing a synthetic vector from a composition vector.

FIG. 2 is a flowchart depicting example operations for sharing a synthetic vector in lieu of a feature vector and FIG. 3 is a flowchart depicting example operations for constructing a synthetic vector from a composition vector. In example embodiments, the SynTF mechanism includes a differentially private anonymization method to derive synthetic feature vectors that keeps the theme of the represented document intact and at the same time prevents authorship attribution attacks. In example embodiments, the SynTF mechanism preserves the sparseness in tf vectors for performance and memory efficiency reasons. A word count entry for one term in the tf vector is taken and probabilistically distributed across all possible terms in a pre-defined vocabulary. The probability of each term is determined according to its similarity with the original word. Word similarity can be expressed in a number of ways, as discussed in more detail below.

Differential privacy presents a strong requirement for the method: Namely, every possible output must occur with non-zero possibility for any other input. This means that a statement on food preference can be processed to the same output as a conversation on politics, with non-zero probability. This has two implications: First, the method ensures that the probability of picking a term is always greater than zero, even for totally unrelated words. Second, it must be possible that two input texts of different lengths produce the same number of words in their resulting tf vectors. Therefore, the method also specifies the output length. Note that this approach limits the number of entries that are changed from the original to the anonymized tf vector, so it keeps the sparseness of the resulting vector intact.

Algorithm Description. In the following, let V denote the underlying vocabulary of size $|V|=L$. The vocabulary could be derived, for instance (e.g., at operation 204), from a reference corpus of documents from a similar context as the target documents which shall be anonymized. The SynTF mechanism will be described for a single document T, but it is possible to anonymize an entire corpus simultaneously. The anonymization for a document T consists of two main phases:

Analysis: the document T is vectorized to its feature vector $t=(t_1, \ldots, t_K) \in R_{\geq 0}^K$ (e.g., at operation 206). Typically, t will be a tf or tf-idf vector over the underlying vocabulary V. Next (e.g., at operation 208), t is normalized with respect to the l1-norm to transform it into a composition vector $0_t := t/\|t\|_1$ whose entries can be interpreted as probability distribution over V.

Synthesis: terms $v_1, \ldots, v_n$ are repeatedly sampled from the distribution θt on V. For each vi, a mechanism (e.g., the Exponential mechanism) is used to pick a substitute output term $w_i \in V$ with probability proportional to a similarity rating $\rho(v_i, w_i)$ (at, e.g., operations 302-308).

Finally (e.g., at operations 210 and 310), a synthetic tf vector $s \in N_{\geq 0}^L$ of length n is constructed (e.g., by counting all the terms wi). The synthetic tf vector may then be shared (e.g., at operation 212) for use in a text mining task in lieu of the feature vector t.

Algorithm 1 (see FIG. 4) illustrates the synthesis phase of the SynTF mechanism in pseudocoele. It uses the following definition:

Definition 3.1 (Categorical distribution). For an enumerable set $V=\{v_1, \ldots, v_k\}$ and associated probability vector $p=(p_v)v \in V$ with $\Sigma_{v \in V} p_v=1$, the categorical distribution, denoted Cat(p), is defined on V through $Pr|Cat(p)=v_1|=p_i$, that is, each $v \in V$ occurs with probability $p_v$.

Differential Privacy Results

Differential privacy-related results on the SynTF mechanism are given below. The previous notation is kept where V is the vocabulary of size L, $t=(t_1, \ldots, t_K)$ is the tf- or tf-idf vector of the target document to be anonymized, and $\theta_t := t/\|t\|_1$ is the corresponding vector of probabilities. For each pair of words $v, w \in V$, there is a similarity score $\rho(v,w) \in [0, 1]$. This score will he used in the Exponential mechanism, which outputs w on input v with probability $$\pi_{v,w} := Pr[E_{\in,\rho}(v) = w] = \frac{\exp\left(\frac{\in}{2\Delta}\rho(v, w)\right)}{\sum_{w'} \exp\left(\frac{\in}{2\Delta}\rho(v, w')\right)}.$$

Note that it is assumed that all potential inputs are adjacent which is a very conservative interpretation of differential privacy. The main result is that Algorithm 1 is differentially private:

Theorem 3.2 (Differential Privacy of SynTF). Given a privacy parameter $\in >0$ and an output length $n \in Nl$, the SynTF mechanism (algorithm 1) fulfills $\in n$-differential privacy.

The proof uses a counterpart of the known postprocessing lemma, which states that a convex combination of an $\in$-differentially private algorithm is again $\in$-differentially private.

Alternative Bound tar the Exponential Mechanism. An alternative bound can be derived for the privacy loss of the Exponential mechanism by also considering the maximum change across all outputs for fixed inputs (in contrast to the sensitivity which tracks the maximum change across adjacent inputs for fixed outputs):

Theorem 3.3 (Alternative bound). Let $\in >0$ be a privacy parameter and $\rho:X \times Z \to R$ be a rating function with sensitivity Δ and $|Z|=L$. Let $\overline{\Delta}=\max_{x \in X} \max_{z,z' \in Z}|\rho(x,z)-\rho(x,z')|$. Then the privacy loss $l(E_{\in, \rho})$ is hounded by $(\overline{\in}+1_{B\eta})$, where $$\overline{\in} := \in \frac{\overline{\Delta}}{\Delta} \text{ and } \eta = \eta(\overline{\in}, L) = \frac{e^{-\in/2}+L-1}{e^{\in/2}+L-1} < 1.$$

Typically, we will have $\overline{\Delta}>\Delta$ since the sensitivity Δ is restricted to adjacent inputs. The growth due to the factor $\overline{\Delta}/\Delta$ in $\overline{\in}=\in \overline{\Delta}/\Delta$ will therefore typically exceed the savings due to $\eta<0$, so the alternate bound $\overline{\in}+\ln\eta$ will be worse than the original bound $\in$ as derived in the standard differential privacy proof for the Exponential mechanism. However, if all inputs are considered to be adjacent, and if ρ is symmetric in its arguments, then we will have $\overline{\Delta}=\Delta$ and $\overline{\in}=\in$, and thus the factor $\eta<1$ will provide a real improvement over the original bound. This is the case in the algorithm:

Corollary 3.4 (Improved differential privacy bound). Given a privacy parameter $\in >0$ and an output length $n \in N$, the SynTF mechanism fulfills $((\in +\ln \eta(\in,L)) \cdot n)$-differential privacy.

Figure 5:
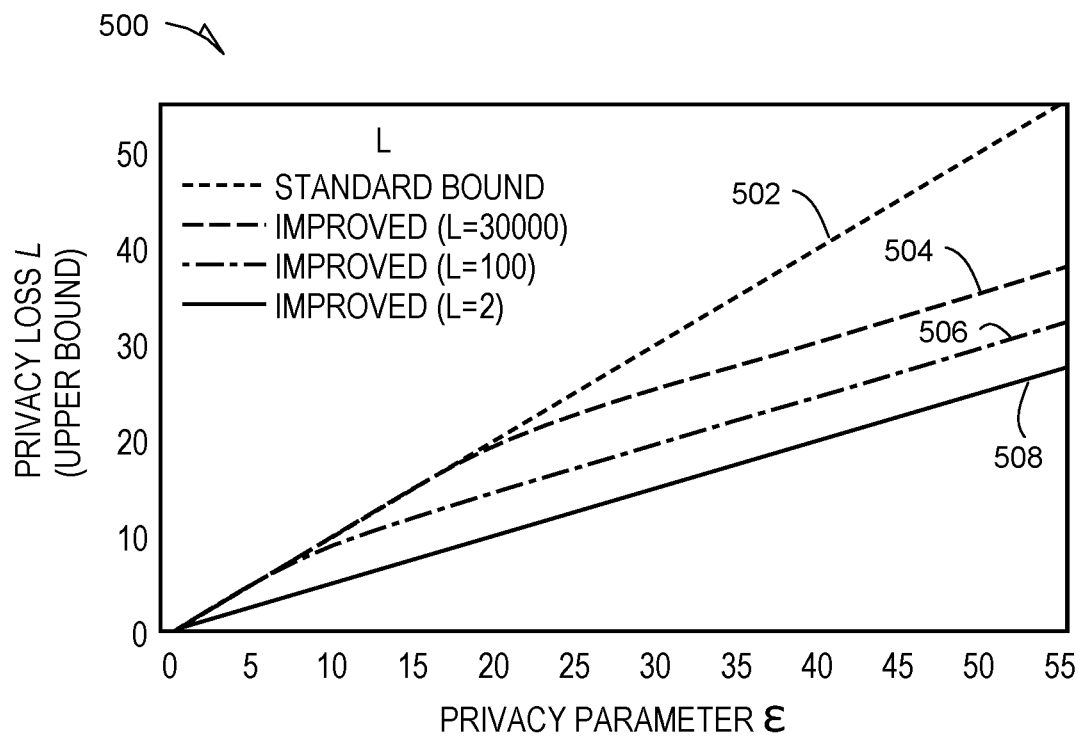
FIG. 5 is a graph depicting an example standard and alternative upper hound for privacy loss given different output space sizes.

The effects of the factor $\eta(\in, L)$ are illustrated in graph 500 of FIG. 5: The original upper bound $\in$ is line 502 on top, the other lines 504, 506, and 508 show the improved upper bound $\in +\ln\eta$ for different values of $L \in \{2, 100, 30000\}$. 30000 may be approximately the size of the vocabulary in some experiments, the effect of the improved bound increases with the privacy parameter $\in$, whereas large output spaces have a smoothing effect that dampens the improvement.

Tight Worst-Case Bounds. A major factor in the differential privacy proof of theorem 3.3 and corollary 3.4 consists of bounding the privacy loss $l(E\in,\rho)$ for the Exponential mechanism used in algorithm 1 (see FIG. 4). This privacy loss is defined as smallest upper bound for the fractions $\pi_{v_1}$, $w/\pi_{v_1}$, w, where $$\pi_{v,w} \propto \exp\left(\frac{\in}{2\Delta}\rho(v, w)\right)$$

are the associated probabilities. The probabilities $\pi_{v,w}$ depend on the underlying vocabulary V, the rating function ρ, and the privacy.

FIG. 5 depicts an example standard and alternative upper bound ε+lnη for the privacy loss $l(E_{\epsilon,\rho})$ given different output space sizes L parameter ε, but does not take the documents t and t' into account.

Therefore, the privacy loss is computed as $$l(E_{\epsilon,\rho}) := \max_{w \in V} \frac{\max_{v \in V} \pi_{v,w}}{\min_{v \in V} \pi_{v,w}}$$

in advance and independently from any documents to be anonymized once the parameters V, ρ, and ε have been determined. The SynTF mechanism with privacy parameter ε and output length n thus in fact fulfills ln- instead of εn-differential privacy where l=l(Eε,ρ) is the privacy loss of the Exponential mechanism. This turns out to lead to huge gains in practice, reducing the privacy loss upper bound by almost 50% in some experiments.

Necessary Condition on ε. The following theoretical result for the Exponential mechanism suggests that in order to get "useful" outputs with a large output space, a large privacy parameter ε must be chosen (e.g., in the order of ln|Z|), under the assumption that there are only few good outputs for each input.

Corollary 3.5 (Necessary Condition on ε). Let ρ:X×Z→R be a rating junction with sensitivity Δ and |Z|∈N. Take any fixed x∈X and denote by $\hat{\rho}_x$ and $\check{\rho}_x$ the maximum and minimum rating scores ρ(x, •), respectively. For a desired minimum rating $\tau \in [\check{\rho}_x, \hat{\rho}_x]$, split Z into T:={z∈Z:ρ(x,z)≥τ} and T̄:=Z/T. Given a probability ρ∈[0, 1], a necessary condition on ε for $\Pr[E_{\epsilon,\rho}(x) \in T] \geq \rho$ is $$\epsilon \geq \frac{2\Delta}{\hat{\rho}_x - \check{\rho}_x} \ln\left(\frac{p}{1-p} \cdot \frac{|\overline{T}|}{|T|}\right).$$

Note that for the SynTF mechanism algorithm, we have $\hat{\rho}_x - \check{\rho}_x \leq \Delta$. Hence for ρ=½, the necessary condition becomes $$\epsilon \geq 2\ln\left(\frac{\rho}{1-\rho} \cdot \frac{|\overline{T}|}{|T|}\right) = 2\ln\left(\frac{|\overline{T}|}{|T|}\right) = 2\ln\left(\frac{|Z|-|T|}{|T|}\right).$$

Given a reasonable choice of τ, the number |T| of "useful" outputs whose score is at least τ will be small. In the case of the SynTF mechanism, τ can be thought of as a threshold for the rating function that distinguishes good alternatives for a given word from poor ones, and |T| would reflect the number of suitable substitutes (synonyms). If |T| is assumed to be bounded by some constant, then ε∈Ω(ln|Z|), that is, ε needs to grow logarithmically in the size of the output space |Z| in order to allow meaningful results.

Evaluation

The SynTF mechanism implementation is described below along with associated parameters and implementation choices. A sample experiment setup and report of evaluation results is also described. Finally, the SynTF mechanism is compared with a traditional information removal approach in the same experiment setup.

A prototype of the SynTF mechanism algorithm can be implemented in a programming language, such as Python (e.g., using a package, such as SpaCy for text parsing functionality, as well as other packages, such the numpy and SciPy packages, for (vector) computations). Besides the explicit parameters mentioned in Algorithm 1, there are various implementation-dependent parameters that influence the SynTF mechanism in its different stages. These parameters and corresponding implementation choices are described below.

Vocabulary and Vectonzation. A custom vectorizer may be built to extract the vocabulary from the training or a given reference corpus, and to subsequently transform documents to their BoW tf vectors. Several special options may be specified. Firstly, for each extracted word, it may be determined to keep its spelling as-is, to change its morphology through lemmatization, or to convert it to lower case. Secondly, the vectorizer may be instructed to include additional terms that are similar or synonymous to the actually extracted words, as to provide a greater choice of candidates for replacing a word with a suitable synonym but hopefully with different spelling to disturb lexical authorship attribution features. The implementation may use synonyms (e.g., as provided by WordNet's synsets). Stop words and numbers may be removed by default.

Similarity Rating Function. The implementation of the rating function ρ(v,w) that expresses the suitability of a substitute term w for an input term v is now described. A fundamental technique is use of word vectors or embeddings which are dense vector representations of words in a real vector space. They are commonly derived with the intention that similar words have embeddings in the vector space that are nearby. The similarity between two words may therefore be computed simply and efficiently (e.g., as cosine similarity between their corresponding word vectors). Models may be selected to derive word vectors based on their achievement of high accuracy in word similarity and analogy benchmarks.

Features such as the frequency of certain words and character n-grams may make an essential and decisive contribution to authorship attribution methods. Suppose a substitute is chosen for a given input term from a set of candidates with comparable similarity rating. Then to best prevent the attack, it is beneficial to pick the candidate that differs most in spelling from the input in order to obscure word and n-gram frequencies. This can be achieved by including the (normalized) Levenshtein or n-gram distance in the rating function for the terms. Note that care must be taken to weight this appropriately—a too strong preference for differently-spelled substitutes will often pick completely different words that also have a different meaning from the original word, thus also negatively affecting the utility.

Figure 10:
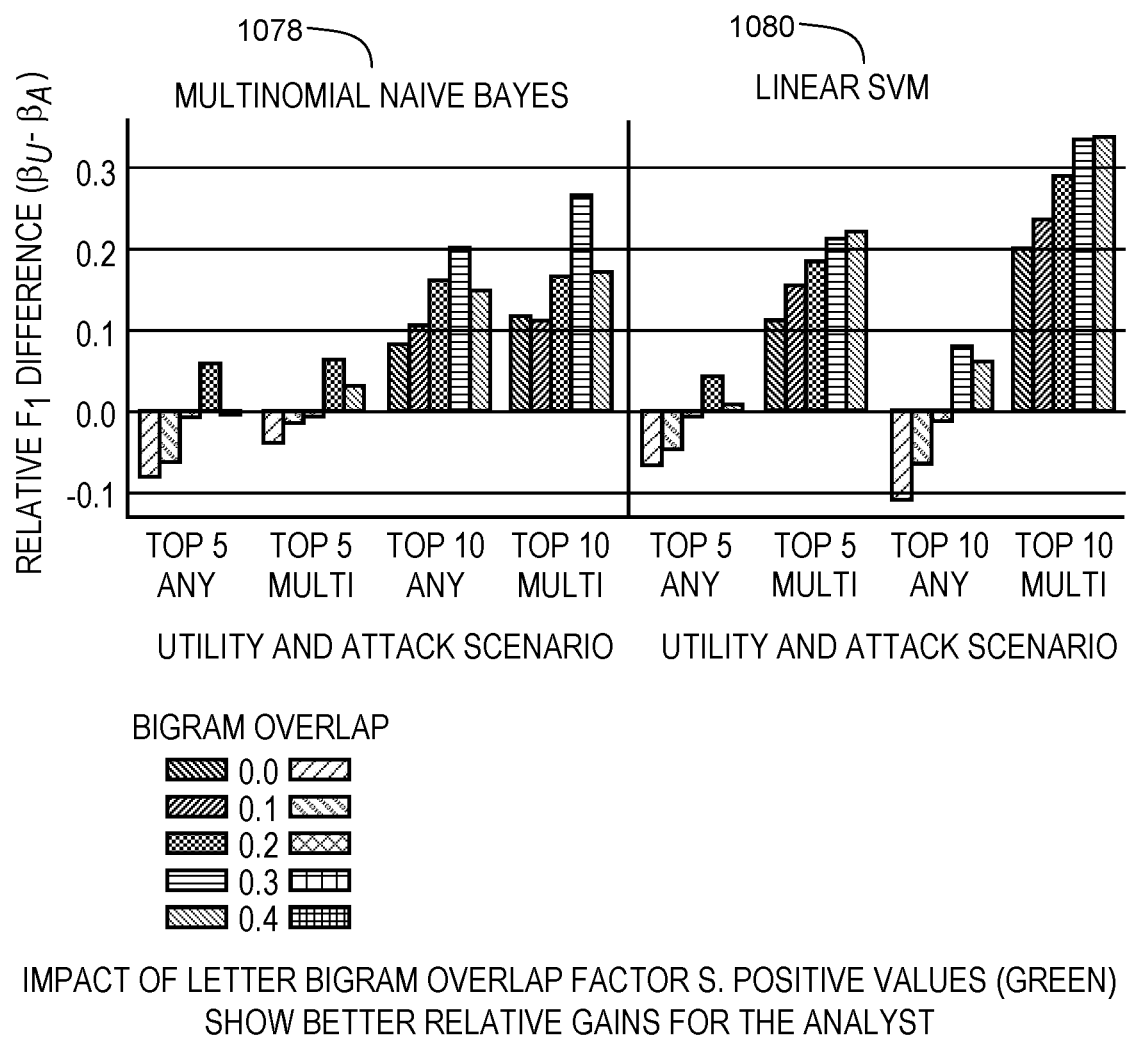
FIG. 10 is a graph depicting an example impact of a letter bigram overlap factor.

The SynTF mechanism may implement the word similarity rating function as ρ(v,w):=cos(v,w)−sB(v,w), where cos(v,w) is the cosine similarity between the corresponding word vectors, and B(v,w)∈[0, 1] is the bigram overlap, i.e., the proportion of matching letter bigrams in v and w. The scaling factor s determines if and how strong the bigram overlap affects the rating. As optimization, the word similarity ratings and probabilities for the Exponential mechanism are precomputed for the entire vocabulary, which yields a significant performance boost. FIG. 10 shows an example impact of letter bigram overlap factors. Positive values show better relative gains for the analyst.

The context and setup of an example evaluation is described below. Damsel. A series of experiments may be performed with Algorithm 1 on a "20 newsgroups" dataset. This data set may comprise thousands of postings from many different newsgroups. It may come with predefined train (60%) and test (40%) sets which may be used throughout the experiments. For the text classification task, a label is provided for each message indicating the corresponding newsgroup. For the authorship attribution task, the "From" field is extracted from the header of each message and used as an author identifier. Note that the header and footer data may be stripped before performing the actual classification and identification tasks as to make them more realistic.

Attack Scenarios. After filtering out missing and ambiguous identifiers, 5735 authors owe counted, but the majority provides insufficient training samples (below 20 for 5711 authors) for properly fitting a model. The attack is therefore evaluated only for the "top" authors with the largest number of messages in the dataset. Since the number of candidate suspects from which the correct author has to be determined also can influence the authorship attribution performance, the attack may be evaluated for a top number of authors (e.g., for the top 5 and top 10 authors).

Figure 6:
FIG. 6 is a table of various example attack scenarios.

FIG. 6 depicts a table 600 of various example attack scenarios and provides the number of train and test messages per author.

Another issue with the dataset may be that some users are active in only a single newsgroup, in which case knowledge of authorship (attack) implies knowledge of the targeted newsgroup (utility). Therefore, two subsets of authors may be devised:

Any: Each suspect author can have postings in any number (one or more) of newsgroups.

Multi: Each author must be active in at least two different newsgroups.

The idea of the "Multi" group is to reduce the similarity between the attacker's and analyst's tasks to allow a clearer distinction when evaluating the impact of the anonymization technique.

Figure 8A:
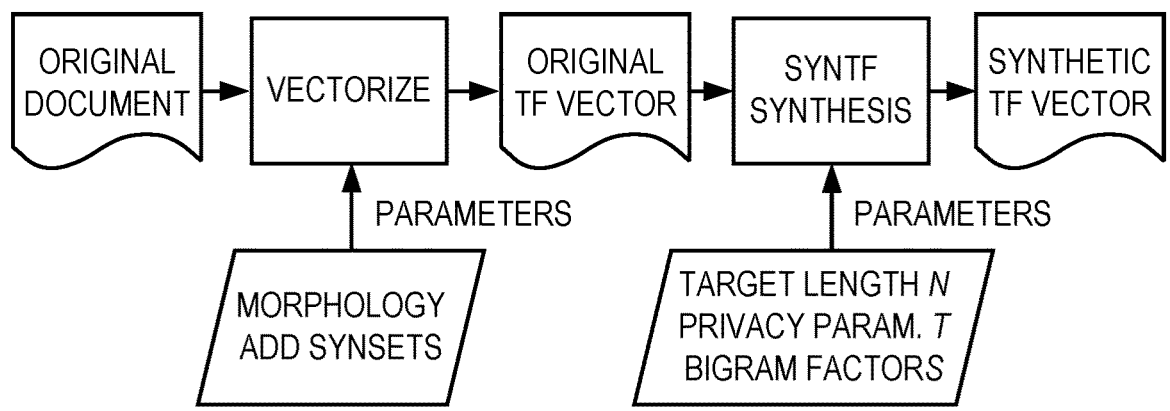
FIGS. 8A-8C are flowcharts depicting example processing pipelines for the SynTF mechanism and subsequence analyst and attacker tasks.

Processing Pipeline. All documents traverse a processing pipeline that can be broken down into three parts: For each document, the main pipeline for the SynTF mechanism, shown in FIG. 8A, first produces a synthetic tf vector (see FIG. 7).

Figure 8B:
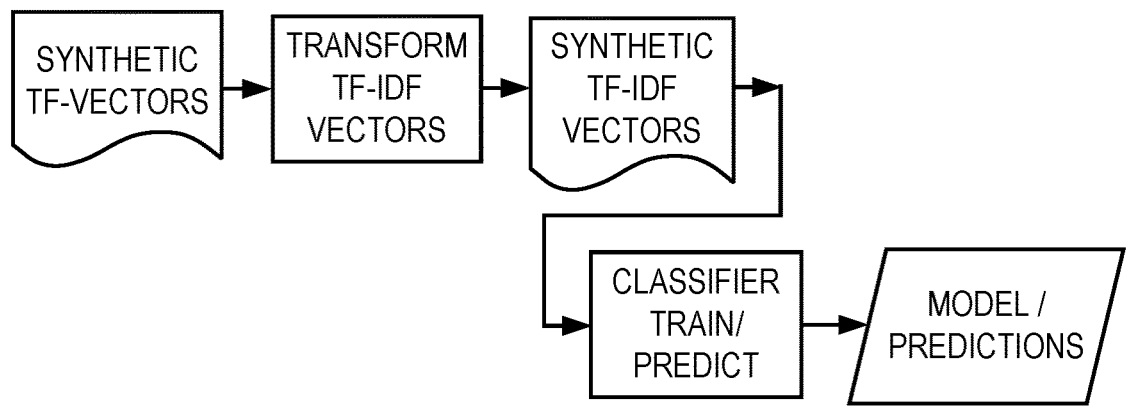
Figure 8C:
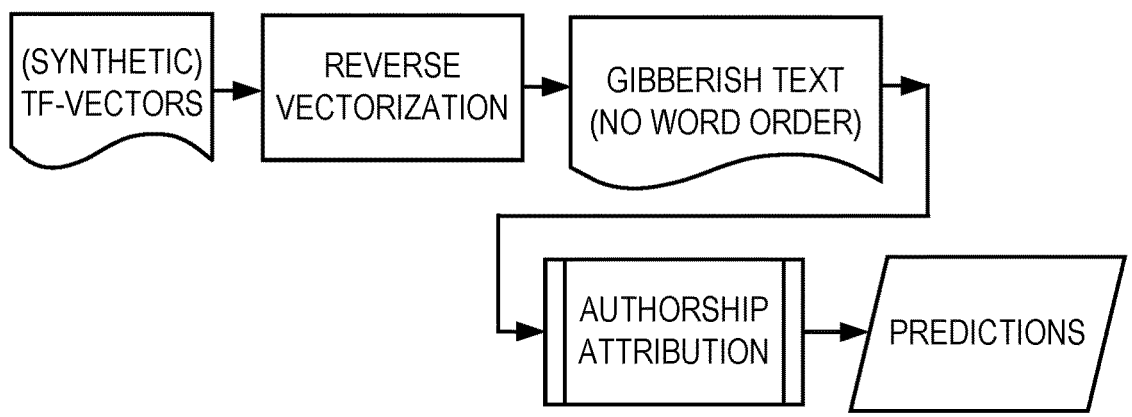

It can be influenced by a number of parameters as described above, Next, the synthetic tf vectors traverse the analyst's text classification pipeline, shown in FIG. 8B, and the attacker's authorship attribution pipeline, shown in FIG. 8C, to measure the prediction performance for each task. In both cases, a multinomial naïve Bayes classifier 1078 and a linear SVM 1080 are evaluated. A number of runs (e.g., 10 runs) of the entire pipeline (anonymization evaluation) are performed for each combination of parameters to reduce fluctuations and get stable results.

The analyst FIG. 8B) first transforms the tf vectors to terin frequency-inverse document frequency vectors (tf-idf vectors) which are commonly used in classification tasks. He then trains a classifier with the training subset of the dataset, and subsequently uses it to predict the newsgroups for the test subset. The classification may be implemented using a programming language and supporting library (e.g., in Python based on scikit-learn using its MultinomiaINB classifier with smoothing ($\alpha=0.01$), and its LinearSVC classifier with default parameters (C=1)).

For the attack, an authorship attribution framework may be used (e.g., "JStylo"). The framework may support several extended feature sets such as "WritePrints." WritePrints includes additional stylistic features on top of the usual BoW that have to be extracted from full texts. However, since the attacker only gets synthetic tf vectors and not full texts, she first converts the numbers in the tf vectors to text by repeating each word accordingly, which allows at least partial deduction of WritePrints features ("reverse vectorization" in FIG. 8C). Note that the "full" WritePrints feature set contains a virtually endless number of features and severely degrades performance (speed). Therefore, despite its title, the "limited" version may outperform the "full" WritePrints in terms of accuracy. Therefore, a default JStylo configuration with the "WritePrints (Limited)" feature set may be used. In example embodiments, JStylo builds on Weka as an underlying machine learning library. Its Naive-BayesMultinomial classifier may be used with Laplace smoothing and its SMO SVM classifier may be used with linear kernel and C=1 by default.

Finding Optimal Parameters. A grid search over the SynTF mechanism parameters listed in table 700 of FIG. 7 may be performed to find "optimal" parameters in the sense that they should simultaneously strongly affect authorship attribution but mostly leave classification into newsgroups unaffected. As metric to find these optimal settings the difference between the relative performance impacts on utility and attack is used: Given parameters p, denote by $\beta_U(p)$ the relative performance of the analyst's classification task (measured as F1 score), and similarly denote by $\beta_A(p)$ the relative performance of the attacker's task. Then the optimal parameters are $\hat{p}=\text{argmax}_p(\beta_U(p)-\beta_A(p))$.

Since the SynTF mechanism may be designed to equally cover all four attack scenarios, it may find optimal parameters that maximize the minimum difference $\beta_U(p)-\beta_A(p)$ over all attack scenarios. Furthermore, it may perform a number of runs (e.g., 10 runs) of the anonymization-evaluation process for each combination of parameters to reduce fluctuations and get stable results.

After running the evaluation, optimal parameters for the SynTF mechanism may be found (e.g., as highlighted in FIG. 7 with privacy parameter $\epsilon=47.5$). However, tight bounds analysis may show that the effective privacy loss $l(E_{\epsilon,\rho})\approx25.4$ is only about half as large. FIG. 6 provides exemplary performance figures in the "Top 10/Any" scenario for both topic classification and authorship attribution. FIGS. 9A1-9B4 illustrate relative performance of analyst and attacker tasks in different stages of the SynTF mechanism process, per attack scenario (with synthetic tf vectors graphed at 902, 904, 906, 908, 910, 912, 914, 916, 918, 920, 922, 924, 926, 928, 930, and 932, respectively). A (positive) gap between the lines shows how much the attack is more affected than utility. Impact on attack increases with number of authors and active groups. The bottom x-axis indicates the privacy parameter $\epsilon$, with the corresponding effective privacy loss values $l(E_{\epsilon,\rho})$ on the top. The various lines mark the utility and attack performances with the original (plaintext), vectorized, and synthetic data, respectively, where the optimal parameters are used for vectorization and synthesis as mentioned above.

As shown in FIG. 10, the vectorization has a noticeably larger impact on the attack caused by the loss of structural and syntactic features, with one small exception (Top 5/Multi). Note that the size of the (positive) gap between the lines indicate the analyst's gain over the attacker in terms of the relative performance of the corresponding stage of the anonymization. Obviously both utility and attack suffer with a decreasing privacy parameter $\epsilon$. However, in most cases the gap between analyst and attacker is even higher than after vectorization, which indicates an even bigger advantage of the analyst. Furthermore, it shows that the SynTF mechanism successfully impairs authorship attribution while having only a mild effect on the classification task with the optimal parameters.

Impact of Attack Scenarios. Comparing the four scenarios with respect to the gap size, the following deductions are made: As expected, authorship attribution quickly becomes harder with an increasing number of suspect authors. Similarly, excluding authors who are active in only one newsgroup widens the gap, as can be seen when going from the "Any" to the "Multi" scenarios. This indicates that the SynTF mechanism is even more effective when the benign and malicious tasks are actually based on distinct problems.

Impact of Parameters from FIG. 7. A key factor in the success of the SynTF mechanism is the letter bigram overlap B in the rating function ρ. Its effect of preferring synonyms with different spelling improves the capability of the method to prevent authorship attribution attacks. The impact of the bigram overlap factors s is illustrated in FIG. 12: Without the bigram overlap (s=0), the attacker has an advantage in all "Top 5" scenarios. Only when s≥0.3, a shift of power is seen in favor of the analyst. In the "Top 10" scenarios, the analyst enjoys an advantage even without the bigram overlap, but his advantage is roughly doubled if the optimal value s=0.3 is chosen.

Regarding morphology, observe that the use of upper and lower-case letters is a stylistic feature that can pose a clue for authorship attribution but barely has any relevance for topic inference. Therefore, transforming all words to lowercase affects the attacker more than the analyst. Lemmatization strips off word endings and hence reduces the attacker's information on writing style further, but it also has an impact on classification since the meaning can change between a word and its lemma. Still, in terms of the definition of "optimal" parameters, using lemmatized words gave the best relative performance gain for the analyst, indicating that the lost word endings are more severe for the attack.

Other parameters may be less insightful: Increasing the output length will help increase both tasks' performance, however, the gain becomes less for larger output lengths. Moreover, the inclusion of additional synonyms in the vocabulary may not provide any benefit.

SVM Anomaly. One anomaly in the "Top 5/Any" scenario for the SVM is observed. Apparently, vectorization already causes a drastic reduction of the attack performance. However, for $\epsilon \geq 45$, going from vectorized to synthetic vectors increases the attack performance. This is unexpected since the information lost in vectorization will not be restored by the synthesis process. Therefore, the SVM might overfit on the vectorized training data, causing poor predictions on the vectorized test data, and the randomness in the synthesis step in turn may act as regularization.

Comparison with Scrubbing Methods. A tool like the open source "scrubadub" tool may be run on the 20 newsgroups dataset to remove PII and evaluate the utility and attack performance in some scenarios.

Figure 11:
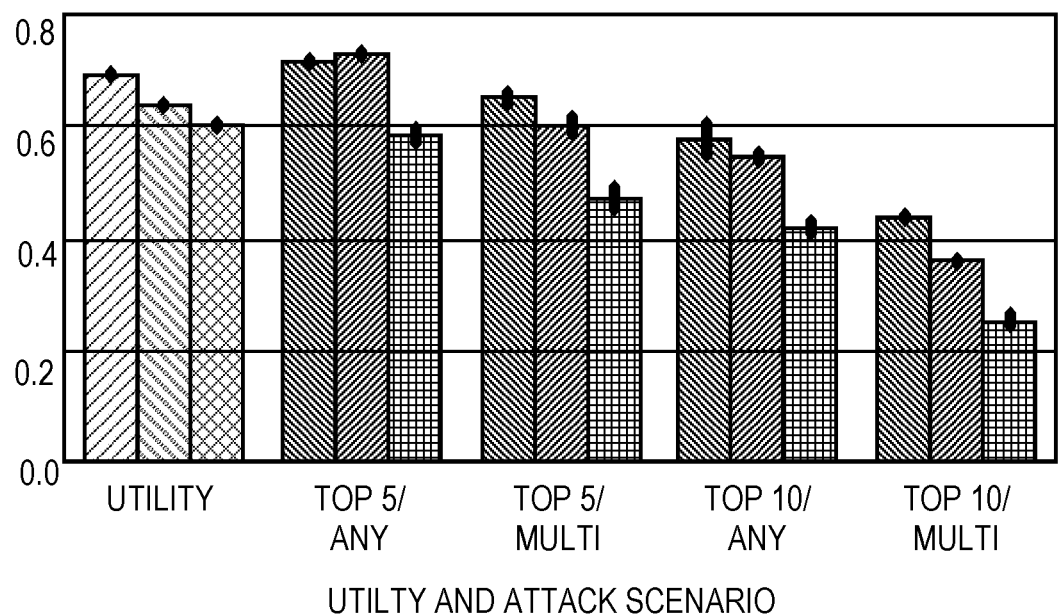
FIG. 11 is a graph comparing example traditional de-identification (scrubbing) with the SynTF mechanism.

FIG. 11 depicts a graph 1100 comparing example traditional de-identification (scrubbing) with the SynTF mechanism (e.g., with optimal parameters).

FIG. 12 depicts a table 1200 that includes example evaluation results. The results indicate that the method outperforms the scrubbing technique by more strongly affecting the attack in all four attack scenarios, at a comparable level of utility. For the "Top 10/Any" scenario listed in table 3, the SynTF mechanism achieves an F1 score of 0.60 for classification, whereas the scrubadub tool is slightly better with 0.64, down from 0.69. For the attack, however, the scrubadub tool drops from 0.64 to 0.57, whereas the SynTF mechanism manages to more than triple the reduction and push the attacker's performance down to 0.42.

The SynTF mechanism comprises a novel approach to produce anonymized, synthetic term frequency vectors which can be used in a variety of text mining tasks in lieu of the original term frequency vectors. The method produces sparse vectors which are favorable regarding performance and memory efficiency. The method fulfills differential privacy which currently serves as a "gold standard" for privacy definitions. Since the method anonymizes each text individually, it can be used locally at the data source to anonymize documents on-premise before collection, for instance, to obtain anonymized training data for machine learning or provide personalized ads based on anonymized emails or search queries.

Although the method may require a large $\epsilon$ to get reasonable utility, evidence is provided that this may be required in the usage scenario at hand: Firstly, texts are anonymized individually where we actually do want an individual's record to influence the result since each record is analyzed independently from the others. Secondly, a necessary condition has been derived on the privacy parameter $\epsilon$ for the Exponential mechanism which states that the privacy parameter high utility is required, provided that only a limited number of "good" outputs are available. To further address the issue with the large privacy parameter, alternative bounds are derived on the privacy loss of the Exponential mechanism, which in an example case provides a substantial reduction of almost 50%.

An extensive evaluation of the method has been performed on a 20 newsgroups dataset and the influence of different parameters has been analyzed. The results indicate that the method effectively prevents authorship attribution attacks with a much larger impact than on classification (utility). In contrast, experiments show that traditional scrubbing methods do not sufficiently prevent authorship attribution attacks.

The methods and the example embodiments disclosed herein may be implemented by a specially-configured computer system. The computer system may be specially configured by one or more modules (e.g., hardware modules or software modules) and implemented by one or more computer processors of the computer system. These methods and the example embodiments disclosed herein may be embodied as instructions stored on a machine-readable medium that, when executed by one or more processors of a computer system, cause the computer system to perform one or more of the operations described herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also he performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 13:
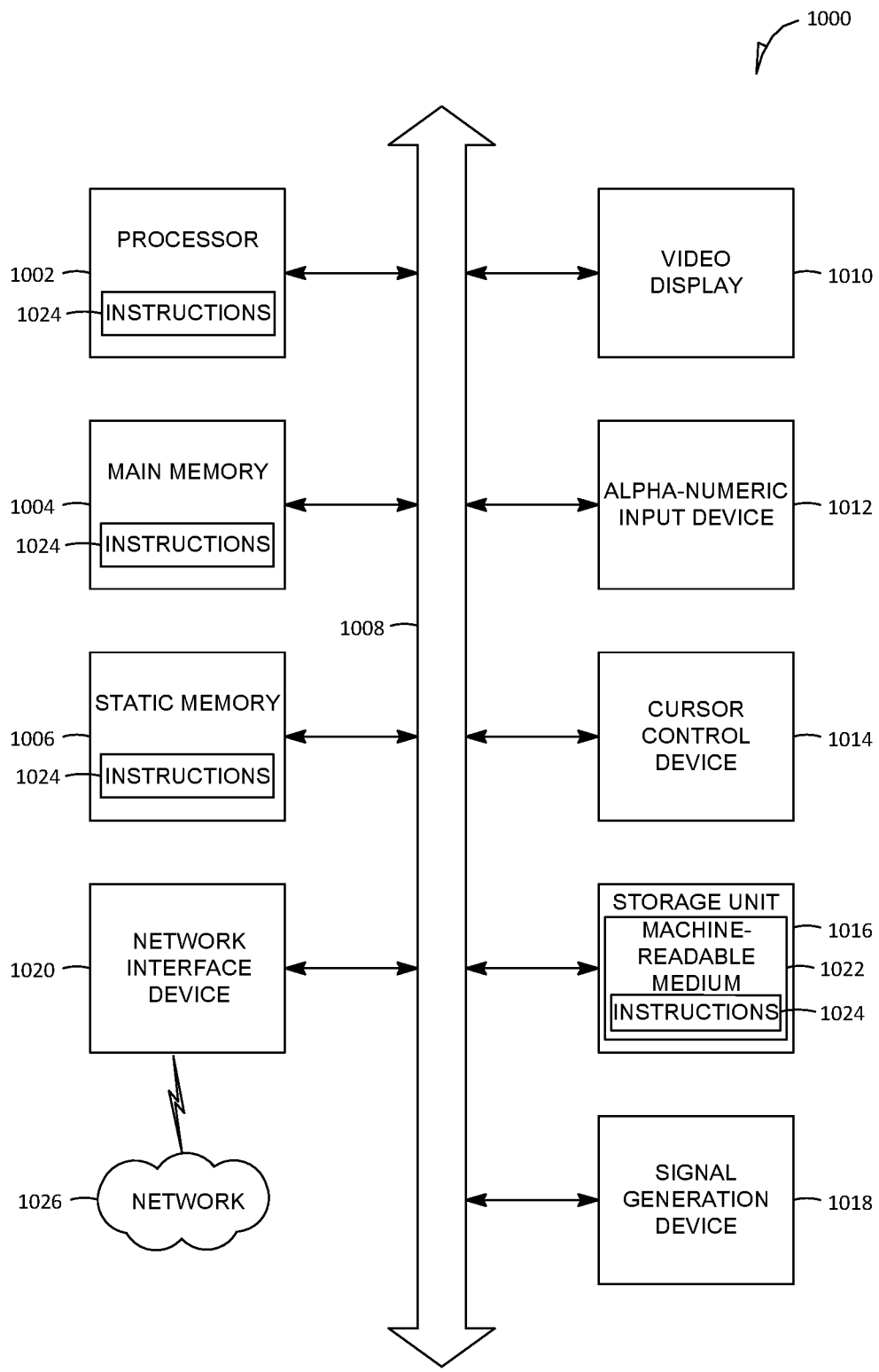
FIG. 13 is a block diagram of a machine in the example form of a computer system within which instructions for causing the machine to perform any one or more of the operations or methodologies discussed herein may be executed.

FIG. 13 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (SIB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc digital video disc) read-only memory (DVD-ROM) disks.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, NVANs, the Internet, mobile telephone networks, plain olde telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 102.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   one or more modules incorporated into the one or more computer memories, the one or more modules configuring the one or more computer processors to perform operations for producing an anonymized vector for a text mining task in lieu of a feature vector, the operations comprising:
   determining a common vocabulary from a corpus of documents, each of the corpus of documents having a context that is similar to a set of target documents;
   accessing a first document of the set of target documents;
   generating the feature vector from the first document;
   transforming the feature vector into a composition vector, the composition vector comprising entries having a probability distribution over the common vocabulary
   constructing a synthetic vector based on the composition vector, the synthetic vector including a substitute term from the common vocabulary for terms included in the composition vector, the constructing of the synthetic vector including selecting a sample term from entries of the composition vector and picking the substitute output term from the common vocabulary based on the substitute output term having a probability of distribution that is proportional to a similarity rating; and sharing the synthetic vector as the anonymized vector in lieu of the feature vector.

2. The system of claim 1, wherein the selecting of the sample term and the picking of the substitute output term are repeated until a desired output length is reached.

3. The system of claim 2, wherein the output length is selected to balance a sparseness of the synthetic vector with a performance increase associated with increasing the output length.

4. The system of claim 1, wherein the similarity rating has a sensitivity that specifies a largest possible difference between two adjacent inputs over all possible output values.

5. The system of claim 1, wherein the similarity rating is calculated as a cosine similarity, a bigram overlap, or a Levenshtein distance between a word vector generated for the sample term and a word vector generated for the substitute output term.

6. The system of claim 1, wherein the sharing of the synthetic vector as the anonymized vector includes receiving the feature vector at an anonymizer machine from a source machine and sending the synthetic vector from the anonymizer machine to a destination machine.

7. A method comprising:
producing, using one or more computer processors, an anonymized vector for a text mining task in lieu of a feature vector, the producing comprising:
determining a vocabulary from a corpus of documents, each of the corpus of documents having a context that is similar to a set of target documents;
accessing a first document of the set of target documents;
generating the feature vector from the first document;
transforming the feature vector into a composition vector, the composition vector comprising entries having a probability distribution over the common vocabulary
constructing a synthetic vector based on the composition vector, the synthetic vector including a substitute term from the common vocabulary for terms included in the composition vector, the constructing of the synthetic vector including selecting a sample term from entries of the composition vector and picking the substitute output term from the common vocabulary based on the substitute output term having a probability of distribution that is proportional to a similarity rating; and
sharing the synthetic vector as the anonymized vector in lieu of the feature vector.

8. The method of claim 7, wherein the selecting of the sample term and the picking of the substitute output term are repeated until a desired output length is reached.

9. The method of claim 8, wherein the output length is selected to balance a sparseness of the synthetic vector with a performance increase associated with increasing the output length.

10. The method of claim 7, wherein the similarity rating has a sensitivity that specifies a largest possible difference between two adjacent inputs over all possible output values.

11. The method of claim 7, wherein the similarity rating is calculated as a cosine similarity, a bigram overlap, or a Levenshtein distance between a word vector generated for the sample term and a word vector generated for the substitute output term.

12. The method of claim 7, wherein the sharing of the synthetic vector as the anonymized vector includes receiving the feature vector at an anonymizer machine from a source machine and sending the synthetic vector from the anonymizer machine to a destination machine.

13. A non-transitory machine-readable storage medium storing a set of instructions that, when executed by one or more processors, cause the one or more machines to perform operations for producing an anonymized vector for a text mining task in lieu of a feature vector, the operations comprising:
determining a common vocabulary from a corpus of documents, each of the corpus of documents having a context that is similar to a set of target documents;
accessing a first document of the set of target documents;
generating the feature vector from the first document;
transforming the feature vector into a composition vector, the composition vector comprising entries having a probability distribution over the common vocabulary
constructing a synthetic vector based on the composition vector, the synthetic vector including a substitute term from the common vocabulary for terms included in the composition vector, the constructing of the synthetic vector including selecting a sample term from entries of the composition vector and picking the substitute output term from the common vocabulary based on the substitute output term having a probability of distribution that is proportional to a similarity rating; and
sharing the synthetic vector as the anonymized vector in lieu of the feature vector.

14. The non-transitory machine-readable storage medium of claim 13, wherein the selecting of the sample term and the picking of the substitute output term are repeated until a desired output length is reached.

15. The non-transitory machine-readable storage medium of claim 14, wherein the output length is selected to balance a sparseness of the synthetic vector with a performance increase associated with increasing the output length.

16. The non-transitory machine-readable storage medium of claim 13, wherein the similarity rating has a sensitivity that specifies a largest possible difference between two adjacent inputs over all possible output values.

17. The non-transitory machine-readable storage medium of claim 13, wherein the similarity rating is calculated as a cosine similarity, a bigram overlap, or a Levenshtein distance between a word vector generated for the sample term and a word vector generated for the substitute output term.

* * * * *